Jan. 27, 1970
T. P. ABBOTT
3,491,847
EXPLOSION COVER
Filed June 15, 1967
2 Sheets-Sheet 1
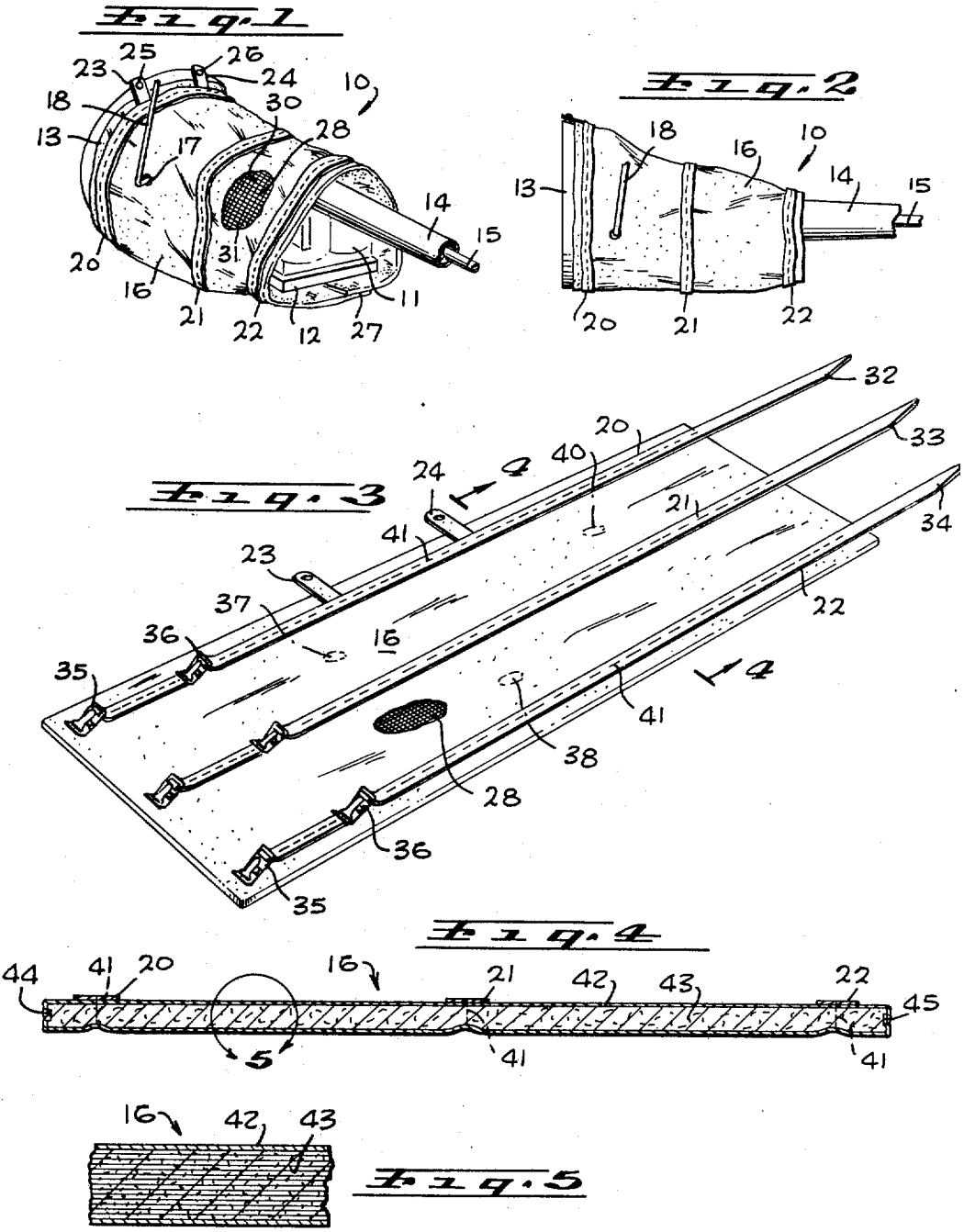
INVENTOR.
THOMAS P. ABBOTT
BY Roger A. Marro

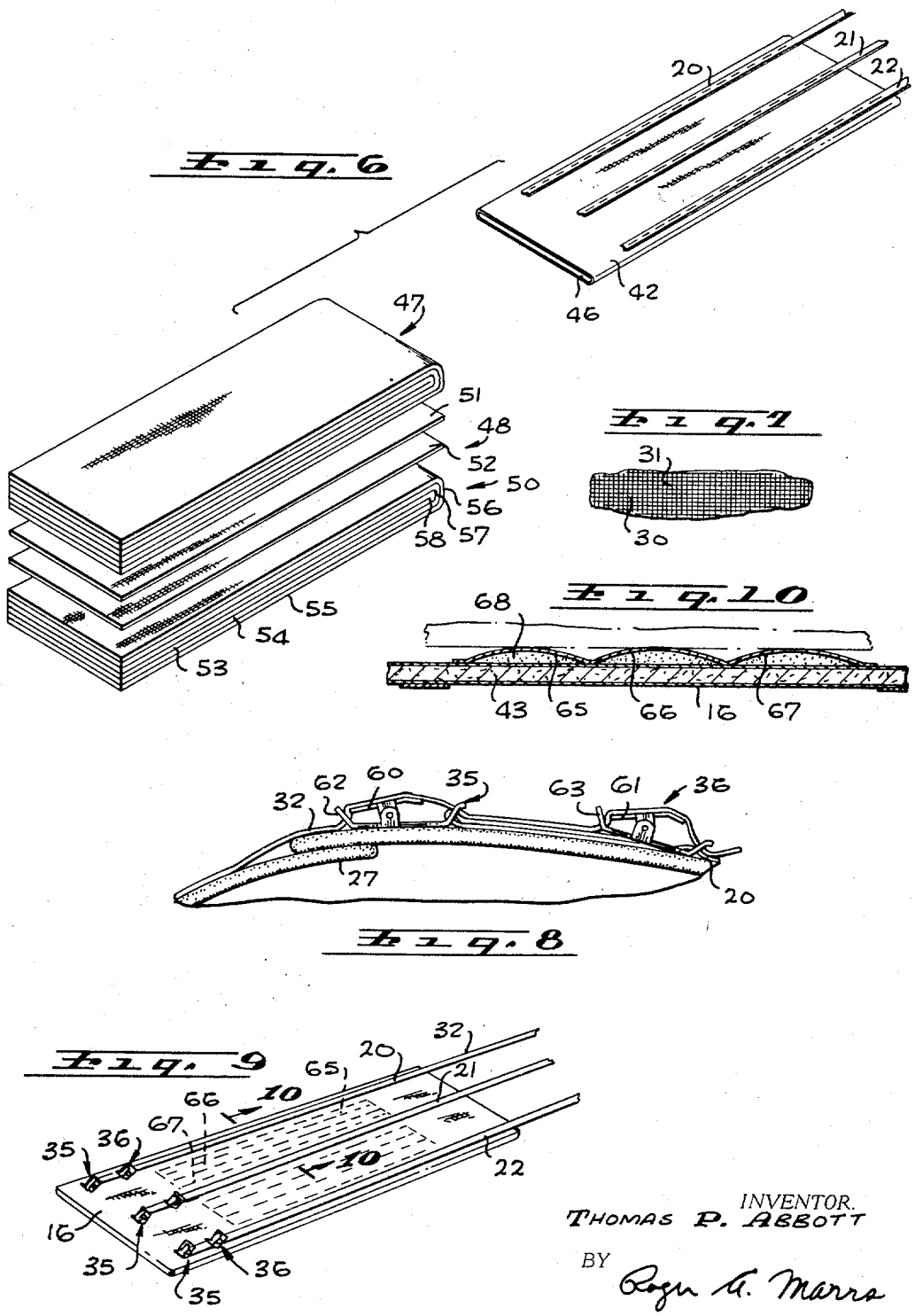

United States Patent Office 3,491,847
Patented Jan. 27, 1970

3,491,847
EXPLOSION COVER
Thomas P. Abbott, Los Angeles County, Calif.
(18434 Topham St., Tarzana, Calif. 91356)
Filed June 15, 1967, Ser. No. 646,260
Int. Cl. B60r 21/00, 27/00
U.S. Cl. 180—82                    9 Claims

ABSTRACT OF THE DISCLOSURE

The explosion cover herein described constitutes a protective pad adapted to be secured about the transmission and bell housing of a vehicle. The pad includes a sleeve enclosing a stack of flexible plastic textile material sheets arranged in three layers in which the middle layer consists of two separate sheets and the inner and outer layers consist of three sheets that are doubled over so that a total of fourteen sheets are provided in the stack. Straps are employed to retain the cover on the transmission and bell housing while a double buckle arrangement is employed to secure the opposite and opposing ends of the straps. Strap means are used to couple the forward side of the cover to the top of the bell housing so that the cover is anchored thereto.

BACKGROUND OF THE INVENTION

Field of the invention

This invention relates to protective material and devices and, more particularly, to a novel explosion cover capable of protecting equipment and personnel against flying shrapnel, flames and released petroleum products.

Description of the prior art

One of the fastest growing sports in the world today is that of automobile racing. As modern technological improvements have leapt forward in areas of power plants, fuels, metallurgy and the like, competitive racing has employed vehicles of previously unknown performance incorporating a variety of components which are subjected to extremely high torque levels, parts turning ratios, high forces of kinetic energy absorption and extreme load bearing and handling characteristics.

Under the stress of such high vehicle performance during competition, component parts breakdown is often occasioned resulting in explosion, fire, fumes and immediate release of quantities of petroleum products such as oil and gas. Obviously, moving parts turning at a high r.p.m. constitute a particular hazard when parts failure occurs. One of the most sensitive components of a high performance vehicle is the transmission and the flywheel which form a part of the vehicle power drive train. Generally, when a parts failure is experienced, the transmission housing and the flywheel bell housing are subjected to extremely high internal explosives pressures which cause the housing to shatter into shrapnel fragments moving at ballistic velocities endangering both the driver and equipment. Furthermore, spectators to the competitive event are also endangered by such shrapnel. Accompanying such an explosion is the presence of flames and fumes nourished by the onrushing airstream which is directed into the driver's cockpit of the vehicle. Attendant to the shattering of the housing is the release of oil which deposits onto the racing pavement or track making vehicle control difficult not only for the damaged vehicle, but for any other vehicles which are required to subsequently negotiate the same track.

Attempts have been made in the past to provide protection against the effects of explosion by the use of steel shields or similar means. Such a device is represented in U.S. Letters Patent No. 2,724,378 which discloses a device specifically adapted to act as a safety cover for an internal combustion engine. The cover is rigid and is pivotally mounted on top of the engine and provides for swinging about the pivot connection under the pressure of an internal explosion. Such devices have not been successful because of the great weight of the steel plate capable of resisting penetration of a projectile. Furthermore, because of the ballistic velocities of the housing fragments, it sometimes happens that the steel shield itself will shatter causing damage to equipment and personnel. Other attempts have been made in the form of providing protective clothing for personnel against death or injury from shrapnel possessing great resistance to penetration by shrapnel fragments which take the form of laminated nylon armor plates or laminated glass fabric armor. Such plates, while possessing ballistic properties quite adequate for the intended purpose, have the drawbacks or rigidity and stiffness and are not particularly effective to confine the effects of an explosion. Examples of such body armor plates are disclosed in U.S. Letters Patent Nos. 2,640,987; 2,773,791; and 2,771,384.

Therefore, the need has existed for a non-rigid and flexible protective cover capable of confining all of the effects of an explosion including the release of metal fragments, flame and petroleum products. Such a cover is needed for the protection of equipment and personnel in connection with parts failure in a high performance roadable vehicle operable to function as a device to confine or hold the effects of the explosion within a prescribed area rather than to limit the concept to one of preventing penetration such as is disclosed in the prior art references.

SUMMARY OF THE INVENTION

The above difficulties and problems associated with personnel and equipment protective covers are obviated by the present invention which provides an explosive cover adapted to be secured about explosion sensitive components of a high performance vehicle and which is capable of confining the effects of an explosion.

The explosion cover provides an elongated sleeve for enclosing a plurality of layers of ballistic textile plastic material sheets which are loosely arranged adjacent one another in an ordered stack. The cover is folded about structure enclosing the parts of the vehicle sensitive to explosion so that the warp of the fabric extends in the direction of moving part rotation while the woof of the fabric extends transverse thereto. The sleeve is retained on the structure in intimate contact therewith by a series of spaced apart straps extending along the longitudinal axis of the cover. The opposite and opposing ends of the straps are secured by a double buckle arrangement so that the cover is form-fitted about the vehicle part covered structure in close surface contact therewith. A pair of anchor straps are coupled between the cover and bolts normally employed to secure the vehicle parts enclosing structure to other supporting structure carried on the vehicle.

A feature of the invention resides in arranging the sheets of the stack so that three layers are provided wherein the middle layer consists of two separate sheets of ballistic material adjacent one another and each inner and outer layer consists of three sheets of ballistic material that are doubled over. Therefore, the combined sheets in the stack provide a cover having a substantially high strength-to-weight ratio and desirable ballistic properties.

Therefore, it is a primary object of the present invention to provide a novel explosion cover adapted to confine the effects of an internal explosion occurring in a housing having a plurality of moving parts rotating at high velocity.

Another object of the present invention is to provide a novel explosion cover including a non-rigid and flexible pad composed of successive layers of ballistic fabric which is foldable about a housing containing parts susceptible to explosion which results when parts failure occur and which is adapted to confine the effects of the explosion such as shrapnel, flames, and release of petroleum products to the immediate area of parts failure.

Another object of the present invention is to provide a novel flexible protective cover which is anchored to a portion of the housing about which the cover is wrapped so that the cover is fixedly secured about the structure wherein the cover includes a plurality of ballistic fabric material enclosed within an elongated sleeve such that the strongest fibers of the fabric weave are extended in parallel to the direction of parts rotation of the parts contained within the structure to be protected.

Still another object of the present invention is to provide a novel protective cover incorporating a plurality of puncturable pockets containing fluid absorbent material adapted to be released upon the event of an explosion for absorption of petroleum products contained within the exploded housing.

Yet another object of the present invention is to provide a novel, flexible explosion protective cover having a plurality of ballistic fiber material arranged in a stack of three layers wherein the sheets of each layer are separate and substantially unattached to adjacent layers which is capable of confining shrapnel within the area of the explosion.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings, in which:

FIGURE 1 is a rear perspective view of the novel explosion cover of the present invention illustrated as being installed about a typical transmission and bell housing incorporated into a power drive train of a high performance vehicle;

FIGURE 2 is a side elevational view of the explosion cover installed on the transmission and bell housing as illustrated in FIGURE 1;

FIGURE 3 is an enlarged perspective view of the explosion cover laid out preparatory to being installed about the transmission and bell housing;

FIGURE 4 is a cross-sectional view of the explosion cover in FIGURE 3 as taken in the direction of arrows 4—4 thereof;

FIGURE 5 as a greatly enlarged fragmentary view of a section of the explosion cover shown in FIGURE 4 as indicated by the arrows 5 illustrating the stack of flexible plastic textile material sheets;

FIGURE 6 is an exploded perspective view of the plurality of textile material layers incorporated into the ordered stack shown in FIGURE 5;

FIGURE 7 is an enlarged fragmentary plan view of a portion of a textile material layer illustrating the fabric warp filaments extending in a longitudinal direction and the woof filaments extending in the direction transverse thereto;

FIGURE 8 is an enlarged side elevational view of the overlapping ends of the explosion cover and the buckle securement means for retaining the cover about the transmission and bell housing;

FIGURE 9 is a perspective view of another embodiment of the present invention incorporating a plurality of pockets for storing petroleum product absorption material; and FIGURE 10 is an enlarged transverse sectional view of the explosion cover as shown in the direction of arrows 10—10 of FIGURE 9.

DESCRIPTION OF THE PREFERRED EMBODIMENTS

Referring to FIGURE 1, the protective cover of the present invention is indicated in the general direction of arrow 10 and is illustrated as being folded or wrapped about a vehicle structure containing moving parts susceptible to explosion when a parts failure occurs. The structure illustrated is a transmission 11 having a pan 12 located on the underside thereof for holding a quantity of oil, a bell housing 13 normally affixed to the flywheel housing of the vehicle and a portion of a housing 14 for enclosing a drive shaft 15. The protective cover 10 includes an elongated pad 16 which is provided with an aperture 17 through which a conventional dip stick tube 18 projects from its attachment to the pan 12.

The pad 16 is retained about the transmission and bell housing by means of straps 20, 21 and 22 which insure that the pad completely surrounds and embraces the bell housing and transmission in form-fitting surface engaging relationship. Preferably, straps 20 and 22 are located along the opposite edge marginal regions of the pad 16 while strap 21 encircles the mid-section of the pad as installed. One side of the pad is anchored to the bell housing 13 by means of anchor straps 23 and 24 which are disposed perpendicular to the strap 20 and are fastened to the bell housing by means of conventional bolts 25 and 26, respectively. The opposite ends of the pad 16 are illustrated as being arranged in overlapping relationship as indicated by the numeral 27 to ensure that the structure to be protected is completely surrounded and embraced by the pad. Preferably, a portion of the rear side of the pad extends rearwardly from the transmission so that the rear end of the transmission is recessed. The rear end of the pad is open since the rear end of the transmission is not susceptible to fragmentation during an internal explosion thereof. However, it is to be understood that the backside of the transmission may be closed by a closure flap carried by pad 16 at this strategic area if the protective cover is intended to be installed on a transmission which requires such coverage.

The pad 16 is illustrated as having a portion broken away as indicated by numeral 28 to illustrate the underlying stack of ballistic textile plastic material sheets. Such fabric is composed of a weave having strong filaments or fibers 30 lying in a plane parallel to the plane of parts rotation carried within the transmission 11. Conventionally, these filaments or fibers are referred to in the art as warp and are considered stronger in tensile strength than the filaments or fibers extending transverse thereto generally referred to as woof as indicated by numeral 31. The warp fibers or filaments are characterized by their ability to be stretched without severance and at the same time being capable of contraction to its original length after being stretched. A typical plastic fabric having these characteristics, as well as others, is known as "nylon."

Referring now to FIGURE 2, it can be seen that the bell housing 13 and drive shaft housing 14 are substantially covered by the pad 16 while the transmission 11 is totally encircled thereby. Although the bell housing and transmission are of irregular contour and configuration, it is to be noted that the pad 16 need not be provided with any particular shape or configuration in order to accommodate the encirclement thereof. This feature stems largely from the fact that the pad 16 is extremely flexible and non-rigid. The protective pad has been employed for the explosive protection of conventional transmissions under the tradenames Tork Flite, Turbo-Hydros and Ford C-6.

Referring now to FIGURE 3, the cover 10 is illustrated in a laid-out position preparatory to being installed about the structure to be protected. It is to be noted that pad 16 is elongated and that the plurality of straps 20–22 inclusive include terminal connecting portions 32–34, respectively, which extend beyond one end of the pad 16. The opposite end of each of the respective straps terminate in a double buckle arrangement as illustrated by a first buckle 35 and a second buckle 36 associated with strap 20. The connecting portions of the straps are intended to be received within the double buckle arrangement of the respective straps so that a fail-safe securement is achieved.

In order that the pad 16 may be accommodated to cover a variety of transmissions having different dip stick and shift lever locations, the pad 16 is initially provided with marked areas 37, 38 and 40 indicating locations of portions of the pad to be removed depending upon the particular variety of transmission about which the pad is to be installed. In the present instance, the dip stick 18 is located in the area designated by numeral 37 and this area has been removed in FIGURE 1 to provide aperture 17. The marked areas 38 and 40 will be left intact since these portions of the pad would require removal for use in connection with other types of transmissions. It is also to be noted that each of the straps 20–22 inclusive are secured to the pad 16 by means of stitching indicated by numeral 41 which extends along the central portion of each strap.

In FIGURE 4, an enlarged cross-section of the pad 16 is illustrated showing that the pad comprises a sleeve 42 for enclosing a plurality of ballistic textile material sheets arranged in an ordered stack 43. The stitching 41 associated with each of the straps 20–22 inclusive extends through the respective straps and both sides of the sleeve 42 through the stack of sheets 43. The sleeve 42 is formed by two sheets of commercial grade "nylon" having their adjacent edge marginal regions stitched together by means of stitching 44 and 45 associated with the respective sides of the sleeve 42.

Referring now in detail to FIGURE 5, it can be seen that the stack 43 of ballistic textile material sheets are arranged in contacting adjacent relationship so that a total of 14 sheets are provided. The provision of a plurality of sheets forming the stack greatly enhance the ballistic absorption properties of the pad by promoting a cone-shaped expanding shock path as the shrapnel fragments commence penetration of the structure. By widening the path of the shock wave of the shrapnel fragment, the extremely high energy absorption properties of the multiple sheets of fabric are fully employed and result in improved anti-ballistic properties. From the point of view of providing adequate containment of shrapnel fragments, improved results have been obtained in materials with regard to absorption of kinetic energy by employing the multiplicity of unlaminated sheets of woven nylon fabric. It will be understood that as a shrapnel fragment penetrates a fabric sheet, the successive sheets recede and that a fragment will not penetrate a second sheet until it has penetrated a first sheet. In one actual cover construction, 100% Du Pont "nylon" was used consisting of fourteen sheets wherein each sheet consisted of fourteen ounce basket weave material, having a test strength of over 15,000 pounds per square inch. This material attained 25% more tensile strength that 1/4-inch steel and weighed only twelve pounds offering 360° protection. The shield constructed was twenty inches wide.

An exploded view of the pad 16 is shown in FIGURE 6 wherein the sleeve 42 includes a mouth 46 into which the stack of ballistic textile material sheets 43 are inserted therein. The sheets of the stack are arranged in three layers as indicated by the arrows 47, 48 and 50, respectively. The middle layer consists of two separate sheets 51 and 52 which are sandwiched between outer layers 47 and 50. Each layer 47 and 50 consists of three sheets 53, 54 and 55 which are doubled over at folds 56, 57 and 58, respectively, so that each layer 47 and 50 includes a total of six sheets of ballistic material. The folds 56, 57 and 58 are so arranged that sheet 55 is on the outside of the layer while sheet 53 is on the inside of the layer.

It is again emphasized that the layers and the individual sheets of the layers are not laminated, joined or otherwise bonded together other than by the stitching 41 associated with the straps 20–22 inclusive. However, if desired, the stitching 41 need not extend through all of the sheets but is generally preferred since it is more convenient to do so during fabrication of the pad.

Referring now in detail to FIGURE 7, a greatly enlarged view of the fabric and weave employed in each of the respective sheets in the stack 43 is shown. It can be seen that the warp fibers 30 extend longitudinally across the elongated sheet while the fill or woof fibers 31 extend normal thereto. The warp fibers 30 are substantially stronger and yet more elastic than those of the fill fibers and it is a feature of the present invention that the pad 16 be deployed about the structure to be protected so that the warp fibers 30 extend in a direction parallel to the rotational direction of any moving parts carried by the structure to be protected.

In FIGURE 8, the double buckle securement arrangement is shown for securing the opposite ends of the straps when the pad 16 is installed about the transmission and bell housing. The buckles 35 and 36 are arranged in series and are identical in construction. The connecting portion 32 of the strap 20 progresses through the buckle 35 and then through the buckle 36 so that a fail-safe securement is assured. Keepers 60 and 61 are pivotally carried on each buckle and cause the connecting portion 32 to bind against eyelets 62 and 63, respectively. The double buckle arrangement for each of the straps is located on the underside of the transmission and bell housing and the opposite ends of the pad 16 overlap as indicated by numeral 27. By means of the double buckle arrangement, as an explosion occurs within the structure, the high pressure generated will tend to expand each of the straps which results in further tightening or binding of the connection portion 32 of each of the straps.

Referring now to FIGURES 9 and 10, another embodiment of the present invention is shown wherein the pad 16 includes a plurality of elongated and rupturable pockets indicated by numerals 65, 66 and 67 located between adjacent straps substantially disposed across the mid-section of the pad. The plurality of pockets are located on the opposite side of the pad from the side having straps 20–22 so that the pockets may reside immediately adjacent to and in contact with the pan 12 of the transmission. Each of the pockets includes a quantity of petroleum product absorbent material 68 such as may be represented by granules of rice, rice powder or the like.

Each of the pockets 65–67 are formed from a commercial nylon material which is characterized by being susceptible to rupture in the event an explosion occurs in the transmission or bell housing. Upon rupture of the pockets by fragments of the housing, the oil contained within the respective housings are rapidly absorbed by the absorbent material 68 so that little, if any, of the petroleum product is available for either burning or deposit onto the roadway or track over which the vehicle is travelling.

The pockets may be readily formed by stitching the fabric at spaced intervals so as to divide the material into the plurality. An entrance can be temporarily left open at the end of each pocket so that the pockets may be loaded with the absorbent material followed by the sealing of the entrance. Construction in this manner provides that the absorbent material 68 will be totally confined within the plurality of pockets and will be in a favorable location to be ruptured so as to receive released petroleum products when a parts failure occurs.

Therefore, it can be seen that the flexible explosion cover or shield of the present invention as embodied in FIGURE 1 may be readily installed by merely wrapping the pad 16 around the transmission and bell housings with the opposite ends of the pad terminating at the bottom of the structure under the pan 12. Aperture 17 is provided for accommodating passage of the dip stick tube, and anchor tabs 23 and 24 are employed for coupling the cover to the bell housing case. The front strap 20 and rear strap 22 are initially tightened and made secure by means of the double buckle arrangement followed by tightening of the mid-section strap 21. However, it is preferred that the mid-section strap be somewhat looser than the outboard straps so as to provide as much flexibility in the explosion area as possible.

Although the present invention has been described in connection with the protection of vehicle transmission and bell housing assemblies, it is to be understood that the protective shield of the invention may be employed for other structures and components as well. Furthermore, it is to be understood that the flexible protective cover may also be employed to protect structures carried on vehicles other than automobiles such as aircraft, boats, ships or the like.

What is claimed is:

1. For a structure housing rotating parts, a protective cover for said structure to confine the effects if an explosion occurring in said structure while said parts are in motion comprising:
    a flexible pad form-fitted about and carried on the exterior of said structure in close surface engaging contact therewith, said paid comprising a plurality of sheets of flexible ballistic plastic textile material arranged in adjacent layers;
    securement means carried on said pad mounting said pad on said structure so as to conform with the contour thereof;
    anchor means on said pad and structure coupling a selected end of said pad to said structure for anchoring said pad thereto; each sheet of said plurality being composed of nylon fabric having warp filaments lying in planes substantially parallel to the plane of rotation of said parts and having woof filaments extending transverse to the warp filaments.

2. The invention as defined in claim 1 wherein said pad is elongated having overlapping ends so as to completely encircle said structure intended to be covered.

3. The invention as defined in claim 2 wherein said securement means includes a plurality of straps carried on said pad in fixed spaced apart relationship and further including double buckle means for releasably securing the opposite and opposing ends of said straps together.

4. The invention as defined in claim 3 wherein said anchoring means includes a pair of straps extending normal to the length of said securement straps and projecting outwardly from one side of said pad adapted to anchor said pad to said structure.

5. The invention as defined in claim 1 wherein said flexible pad is composed of three layers wherein said middle layer consists of two separate and adjacent sheets of ballistic textile material and each outer layer consists of three sheets doubled over so that a total of fourteen sheets are combined in said stack.

6. The invention as defined in claim 1 comprising:
    an elongated sleeve composed of plastic textile material; said sleeve enclosing said plurality of sheets;
    said securement means including a plurality of straps secured to said sleeve in fixed spaced apart relationship adapted to retain said sleeve about said housing so as to substantially conform to the general shape thereof; and
    said anchor means secured to said sleeve and interconnecting said sleeve with said housing to secure said sleeve and said stack to said housing.

7. The invention as defined in claim 6 wherein said sheets comprise a total of fourteen sheets arranged in said stack consisting of two separate sheets disposed between an inner and an outer layer each consisting of three doubled sheets.

8. A protective cover adapted to confine the effects of an explosion occurring in a structure enclosing moving parts while in motion comprising:
    a flexible pad form-fitted about and carried on the exterior of the structure in close surface engaging contact therewith, said pad comprising a plurality of sheets of flexible ballistic plastic textile material arranged in adjacent layers;
    securement means carried on said pad mounting said pad on the structure so as to conform with the contour thereof;
    anchor means coupling a selected end of said pad to the structure for anchoring said pad thereto; and
    rupturable compartments carried on said pad storing a quantity of fluid absorbent material therein and adapted to be released upon the occurrence of an explosion to absorb fluid released thereby from the structure.

9. In a protective cover adapted to confine the effects of an explosion occurring in a power plant drive train housing enclosing moving parts rotating in a petroleum product comprising:
    an elongated sleeve composed of plastic textile material;
    an ordered stack of separate sheets lying adjacent each other enclosed by said sleeve wherein each sheet is composed of a flexible ballistic textile plastic material;
    a plurality of straps secured to said sleeve in fixed spaced apart relationship adapted to retain said sleeve about said housing so as to substantially conform to the general shape thereof;
    anchor means interconnecting said sleeve with said housing to secure said sleeve and said stack to said housing; and
    rupturable pocket means carried on a selected side of said sleeve in close surface contact with said housing, said pocket means being loaded with a fluid absorbent material adapted to rapidly soak up petroleum products contained in said housing responsive to rupture of said pocket means by the effects of an explosion to receive and absorb the petroleum products released by said housing.

References Cited
UNITED STATES PATENTS

| | | | |
|---|---|---|---|
| 3,455,409 | 7/1969 | Clark | 180—82 |
| 926,800 | 7/1909 | Young | 74—608 |
| 2,326,713 | 8/1943 | Wesseler | 89—36 |
| 2,417,636 | 3/1947 | Ditzler et al. | |
| 2,640,987 | 6/1953 | Ehlers | 89—36 X |

FOREIGN PATENTS

| | | |
|---|---|---|
| 251,062 | 4/1926 | Great Britain. |

OTHER REFERENCES

"Hotrod Parts Illustrated," September 1966, pp. 25 to 27, article entitled, "Rubber Scattershield?"

A. HARRY LEVY, Primary Examiner

U.S. Cl. X.R.

74—608; 102—22; 150—52; 180— 1, 70